(No Model.) 7 Sheets—Sheet 1.

H. P. BROWN.
ELECTRIC MOTOR CAR.

No. 449,752. Patented Apr. 7, 1891.

Fig. 1.

Witnesses:
Lew. C. Curtis
H. W. Munday

Inventor:
Harold P. Brown
By Munday, Evarts & Adcock
His Attorneys.

THE NORRIS PETERS CO., PHOTO-LITHO., WASHINGTON, D. C.

(No Model.) 7 Sheets—Sheet 4.

H. P. BROWN.
ELECTRIC MOTOR CAR.

No. 449,752. Patented Apr. 7, 1891.

Witnesses:
Geo. E. Curtis
H. W. Munday

Inventor:
Harold P. Brown
By
Munday, Evarts &
Adcock
His Attorneys (No Model.)

H. P. BROWN.
ELECTRIC MOTOR CAR.

No. 449,752. Patented Apr. 7, 1891.

Inventor:
Harold P. Brown
By Munday, Evarts, & Adcock
His Attorneys.

(No Model.)  7 Sheets—Sheet 7.

H. P. BROWN.
ELECTRIC MOTOR CAR.

No. 449,752. Patented Apr. 7, 1891.

Witnesses:
Lew. E. Curtis
A. W. Munday

Inventor:
Harold P. Brown
By Munday Evarts & Adcock
His Attorneys.

THE NORRIS PETERS CO., PHOTO-LITHO., WASHINGTON, D. C.

UNITED STATES PATENT OFFICE.

HAROLD P. BROWN, OF NEW YORK, N. Y.

ELECTRIC-MOTOR CAR.

SPECIFICATION forming part of Letters Patent No. 449,752, dated April 7, 1891.

Application filed May 26, 1890. Serial No. 353,244. (No model.)

*To all whom it may concern:*

Be it known that I, HAROLD P. BROWN, a citizen of the United States, residing in New York, in the county of New York and State of New York, have invented a new and useful Improvement in Electric-Motor Cars, of which the following is a specification.

My invention relates to improvements in electric-motor cars.

The object of my invention is to provide an electric-motor car of a simple, efficient, and durable construction, and in which the armature-shaft of the motor may revolve continuously, while the speed of the car and amount of force communicated from the motor to the driving-wheels of the car may be varied as desired or stopped entirely.

My invention consists in the novel devices and novel combinations of parts and devices herein shown and described, and more particularly pointed out in the claims.

In the accompanying drawings, which form a part of this specification, and in which similar letters of reference indicate like parts.

In the drawings, A represents the car; B, the truck-frame; C, the car-axles, and C' the bale-shaped levers or links by which the truck-frame is suspended from the car-axles C, so as to permit a longitudinal movement or swinging of the car-axles to facilitate the movement of the car on or around a curve.

D is the motor-frame, D' its armature, and $D^2$ its field-magnets. The motor-frame is of a shell or hollow form and is provided with removable standards or supports $D^3$, in which the armature-shaft $D^4$ is journaled, so that by simply removing the bolts or fastenings $D^5$, by which the standards are attached to the motor-frame, the armature and its shaft may be bodily removed from the motor-frame. This is a matter of great convenience in practical operation, as the armature is the part of the motor which is most liable to get out of order and need repair. By so mounting it in the motor-frame that it may be readily detached and removed therefrom without disconnecting the motor from the car the removing, repairing, and replacing of the armature are greatly facilitated.

Figures 8, 18:
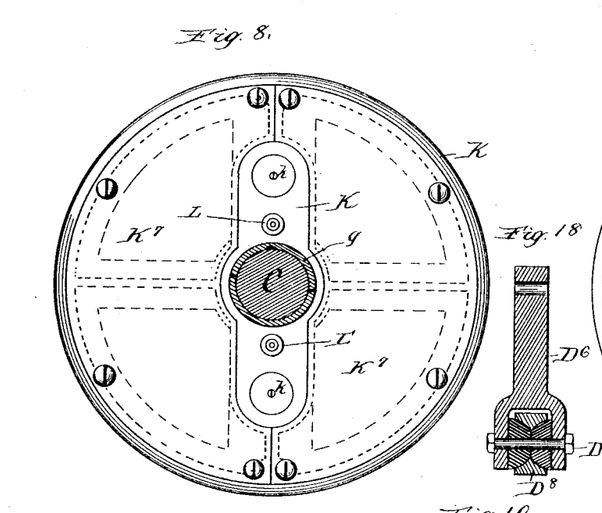
Fig. 8 is an end or face view of the reducing-gear.
Fig. 18 is a detail view of the motor-frame hanger.
Figure 9:
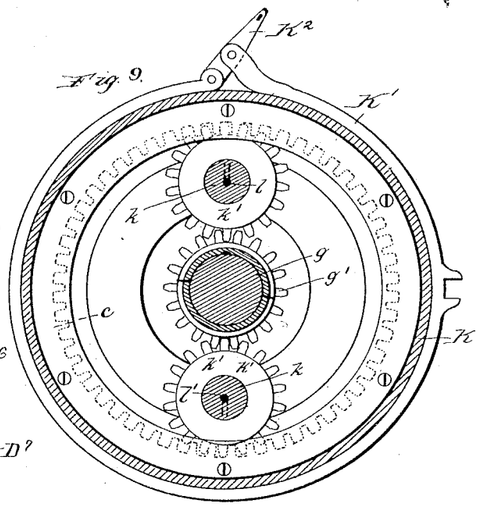
Fig. 9 is a section on line 9 9 of Fig. 3.

The motor-frame D is supported from the truck-frame B by pivoted or swinging links $D^6$. The bolts or pivot-pins $D^7$, which pass through ears $D^8$ on the motor-frame and by which the pivoted links $D^6$ are connected to said frame, pass through rubber or other insulating and sound-deadening cushions, washers, or packings, a suitable construction of which is shown in Fig. 18. By thus suspending the motor-frame by pivoted links or hangers from the truck-frame and by providing the connections between the hangers and frame with yielding cushions I prevent to a very large extent the communication of the sound and other vibrations of the motor to the truck-frame or car.

E E are the commutator-brushes of the motor. Each of these brushes is secured to or mounted upon a pivotal or rotatable holder E', so that the brush may be turned back out of the way without disturbing the electric connections when it is desired to remove the armature and its shaft from the motor-frame. The pivotal or rotatable holder E' turns upon a coupling-ring $E^2$, secured by a bolt $E^3$ to the insulated bracket $E^4$, attached to the motor-frame. The rotatable holder E' and coupling-ring $E^2$ are provided with locking-notches and projections $e$ $e'$, which engage each other and serve to hold the brush in its normal or operative position and in its retracted position. A coil-spring $E^5$ serves to press or hold the parts $E'$ $E^2$ in engagement with each other. The brush-holder E' is furnished with a pivoted arm $E^6$ and spring $E^7$, by which the brush is pressed against the commutator-ring. By simply removing the coupling-bolt $E^3$ the brush-holder and brush may be bodily removed when desired.

The armature-shaft $D^4$ is provided with a grooved pulley $d$, by which, through a rope connection F, the power of the motor is communicated to a similarly-grooved driving-pulley G on the car-axle C. One loop of the rope connection F passes around a movable rope-tightener pulley H. The rope-tightener pulley H is journaled upon a movable bracket or block H', which slides back and forth upon a suitable guide $H^2$ on the truck-frame. The requisite tension is or may be put upon the rope connection F by a spring $H^3$, which acts against the block of the rope-tightener pulley. The grooved pulley G revolves loosely on the car-axle, being secured or keyed to a revolving sleeve $g$, which fits and revolves loosely on the car-axle. The driving-pulley $d$ on the motor-shaft is secured to the shaft between its bearings $D^3$ $D^3$, so that the tension or strain of the rope connection will not tend to cause a binding or angle strain upon the motor-shaft or between the revolving armature and the field-magnets. To further balance the strain or tension of the rope connection upon the motor-shaft, I ordinarily in practicing my invention provide both car-axles with a pulley G, so that the tension or strain of the rope connection between the motor-shaft and the two car-axles will counterbalance each other. To reduce as far as may be the motion communicated from the motor-shaft to the pulley or pulleys G, the pulley $d$ should be made as small as practicable and the pulley G as large as can be conveniently used.

K is a friction-wheel journaled to revolve loosely on the sleeve $g$, surrounding the car-axle C. This friction-wheel is provided with a band or other suitable brake K', which is tightened or applied by a lever $K^2$, connected by a chain or line $K^3$ with the brake-windlass $K^4$. The friction-wheel K is provided with one or more (preferably two) studs $k$, on which are journaled pinions $k'$ $k'$, which mesh with a pinion $g'$, secured to or made integral with the revolving sleeve $g$, and also with an internal gear $c$, keyed to the axle C. When force is applied to the brake K', it will tend to hold the friction-wheel K from revolving and cause the wheel K to revolve more or less slowly or be held stationary, according to the degree to which the brake is applied, and a corresponding motion will thus be communicated through the gears $g'$, $k'$, and $c$ to the car-axle. When the brake is applied with a sufficient force to hold the friction-wheel K stationary, the motion of the sleeve $g$ will be communicated to the gear $c$ and axle C reduced in the proportion of three to one, as shown in the drawings. To diminish the friction as far as may be, the gears $g'$, $k'$, and $c$ are caused to revolve in oil, the oil-chamber $c'$ being made tight by providing the gear or wheel K with the covering-plate $K^7$ and by furnishing the gear $c$ and friction-wheel K with overlapping shoulders $c^3$ $k^2$, and by providing the gear $c$ with a packing-ring $c^4$. By this means the gears are inclosed in a tight oil-chamber.

L, L', and $L^2$ are lubricators for lubricating the bearings of the gears $k'$ $k'$ and of the sleeve $g$ through the communicating oil-ducts $l$ $l'$ $l^2$. The friction-wheel K is held in place against the gear $c$ by a collar $k^3$, surrounding the sleeve $g$.

N N represent the brakes of the car. Each brake-beam is furnished with a brake-lever $n$, connected by a link $n'$ with an intermediate lever $n^2$, which is connected by a link and chain or other suitable connection $n^3$ with the brake-windlass $K^4$. The chain $n^3$ is reversely connected to the windlass in respect to the brake of the friction-wheel K, so that the rotation of the windlass in the direction necessary to apply the brakes to the car-wheels necessarily releases the brake from the friction-wheel K, and vice versa. By thus combining together the car-brake and the brake by which the driving-power is applied I am not only enabled by a single movement or operation to both release the driving-power and apply the car-brake, but I also prevent the wasting of power incident to applying the car-brake while the driving-power of the motor is acting upon the wheels. To hold the brake-windlass in any desired position with either the car-brake or the driving-power applied, as may be desired, I provide the brake-windlass with a double ratchet $k^4$ and a pawl-lever $k^5$, furnished with two pawls $k^6$ $k^7$.

Figure 6:
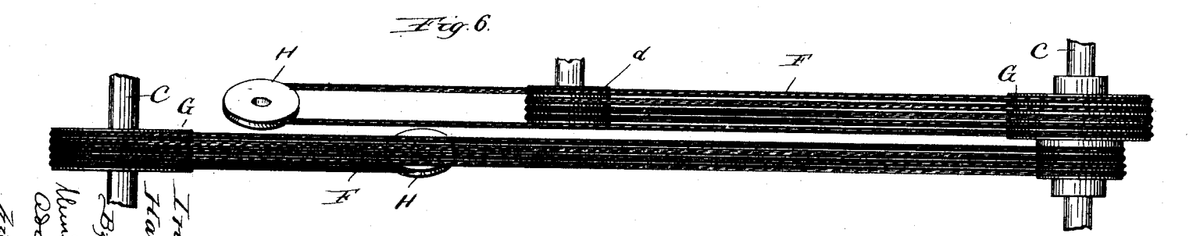
Figs. 6 and 7 are modified arrangements of the rope connection.
Figure 7:
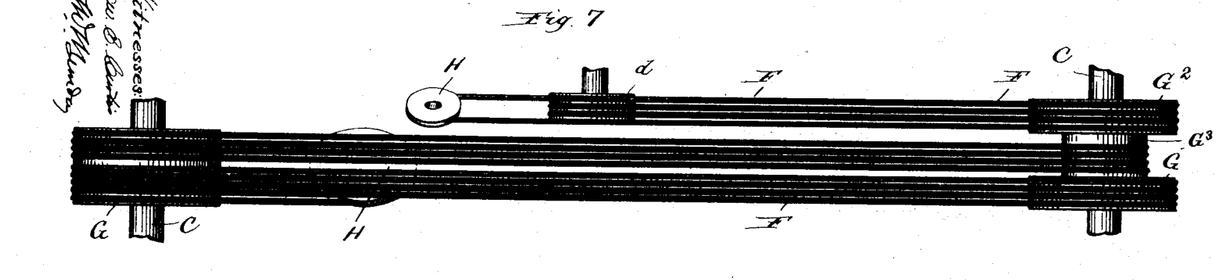
Figure 16:
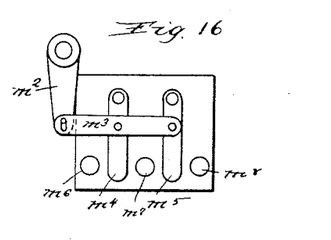
Fig. 16 is a detail view of the switch.

M is the switch-lever by which the electric current is turned on or off from the motor or the motor reversed. This switch-lever M is furnished with a pawl $m$, which engages a notched wheel $m'$, to prevent any accidental movement of the switch and the danger or accidents that may be occasioned thereby. At Fig. 16 the switch is shown. It consists simply of an arm $m^2$, which is operated by the switch-lever M, connecting-link $m^3$, switch-levers $m^4$ $m^5$, and the contact-points $m^6$ $m^7$ $m^8$. In Fig. 6 I have shown a modification of the rope connection wherein an idler or motion-reducing pulley is journaled on one of the axles, an additional rope F being employed to communicate the reduced motion to the other axle, and of course, also, an additional rope-tightener pulley. In Fig. 7 I have shown a still further modification, in which two ropes F are employed for connecting the two axles and thus driving them both, the pulley $G^3$ $G^3$ being loose upon the axle, which serves as a counter-shaft for this pulley.

Figure 10:
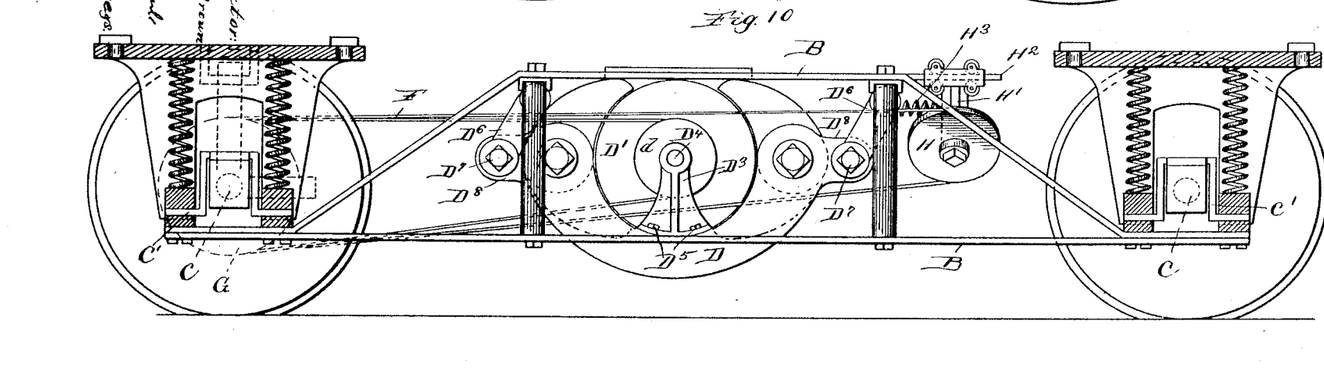
Fig. 10 is a detail side elevation of the truck, showing the manner of mounting the motor on the truck-frame and the particular method of supporting or suspending the truck-frame from the car-axles.
Figure 11:
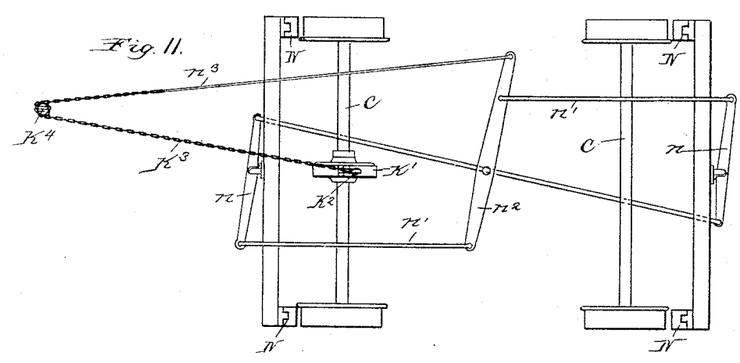
Fig. 11 is a detail plan view showing the combination of the car-wheel brakes with the friction brake or device which controls or regulates the amount of power transmitted from the motor to the driving wheel or axle of the car.
Figure 12:
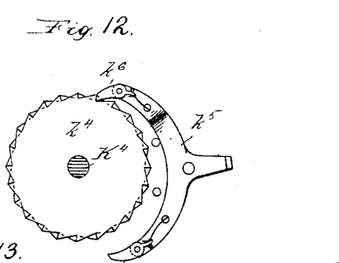
Figs. 12 and 13 are detail views of the brake-windlass and its double ratchet.
Figure 13:
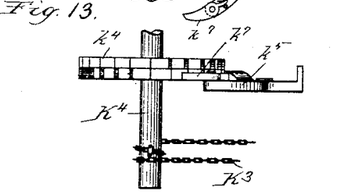
Figure 14:
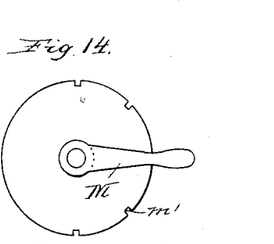
Figs. 14 and 15 are detail views of the switch-lever and its pawl and ratchet or locking wheel.
Figure 15:
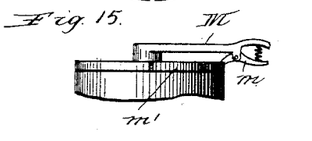

By combining the motor and car-axles with a rope connection for communicating the motion of the one to the other I am enabled to employ swinging hangers between the car-axles and truck-frame, so as to permit a longitudinal movement of the axles to facilitate the passage around curves, and by this same means I am also enabled to suspend the motor-frame by pivoted hangers from the truck-frame. As the motor is thus suspended from the truck-frame by pivoted hangers, the motor-frame may be adjusted, as shown in Fig. 10, normally somewhat above the lowermost position which the pivoted hangers would permit it to occupy, so that the weight of the motor itself will tend to keep a proper tension upon the rope or flexible connections between the motor-shaft and the car-axles.

It will be noticed that in my invention the motor is so connected through the friction-wheel and planet-gear mechanism with the car-axle that the motor is permitted to revolve continuously while the car may be stopped, so that the momentum of the revolving armature may be utilized in starting the car, by which means I am enabled to greatly economize the amount of current or electric energy necessary for the practical operation of the car. This also adds materially to the durability of the motor, as it is well known that the greatest danger of burning out or injuring the motor-armature occurs in the act of starting the car. The brake K' is held from revolving with the friction-wheel K by means of a bail-shaped bracket or frame $K^5$, which is mounted on the car-axle C, and is held from revolving by an arm $K^6$, which engages a stationary part of the truck-frame.

Figure 1:
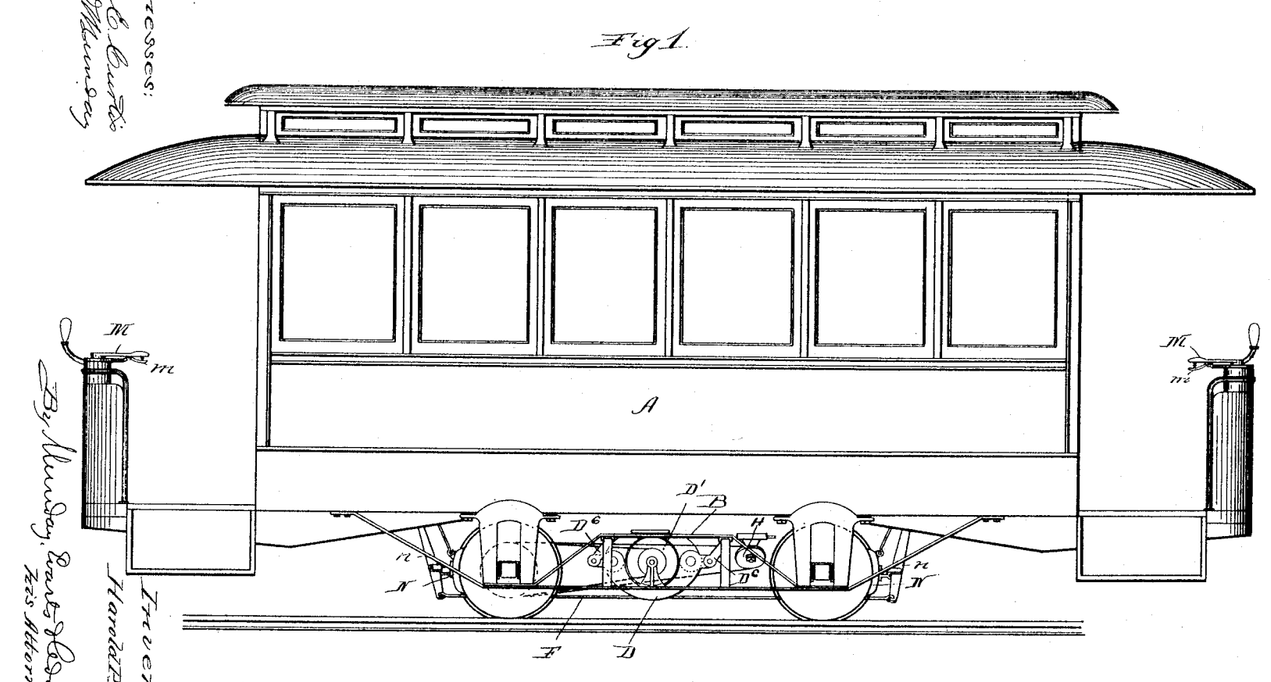
Figure 1 is a side elevation of a device embodying my invention.
Figure 2:
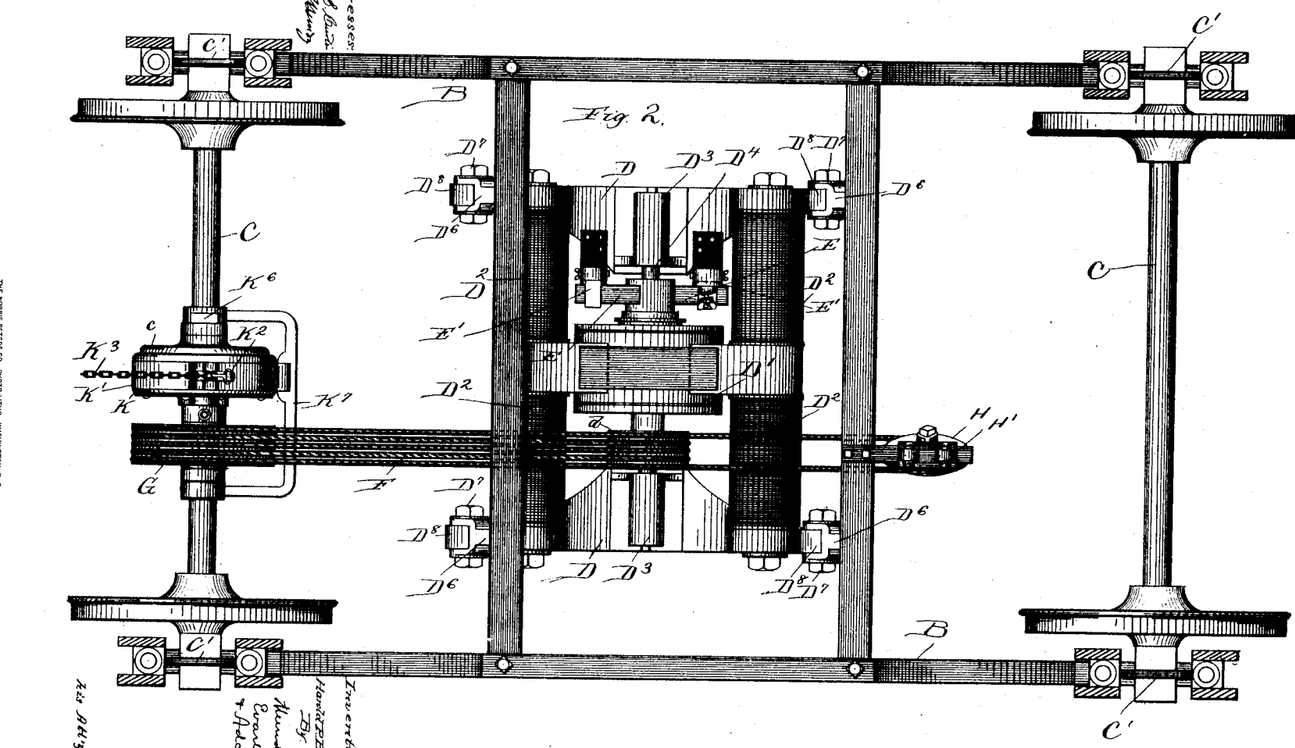
Fig. 2 is a plan view showing the motor and the rope connection from the motor-shaft to one of the car-axles.
Figure 3:
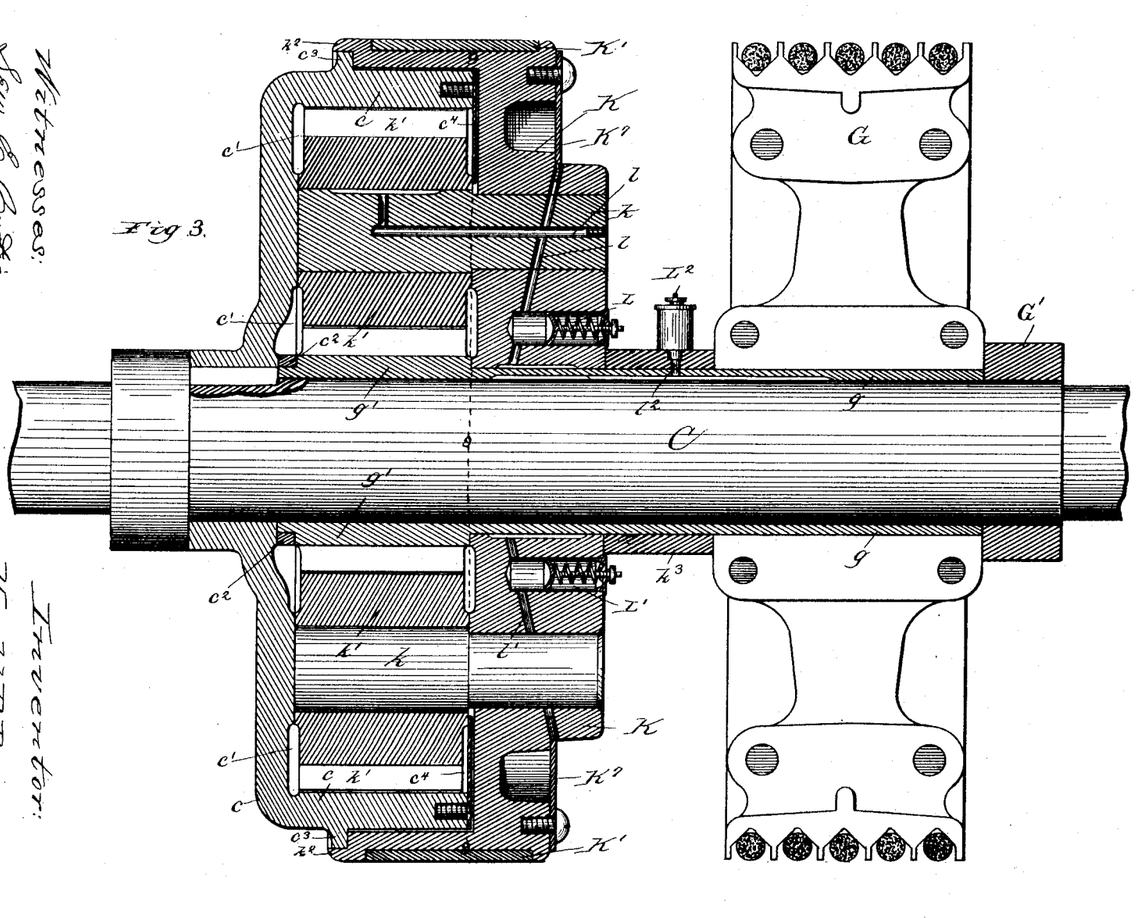
Fig. 3 is an enlarged detail sectional view of the driving-pulley and reducing-gear.
Figure 4:
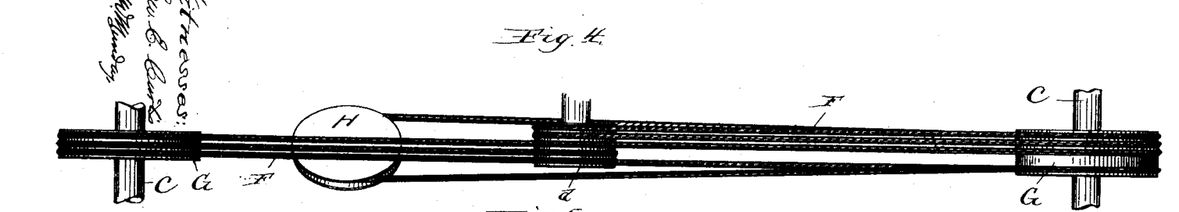
Fig. 4 is a detail plan view showing the rope connection from the motor-shaft to both the car-axles.
Figure 5:
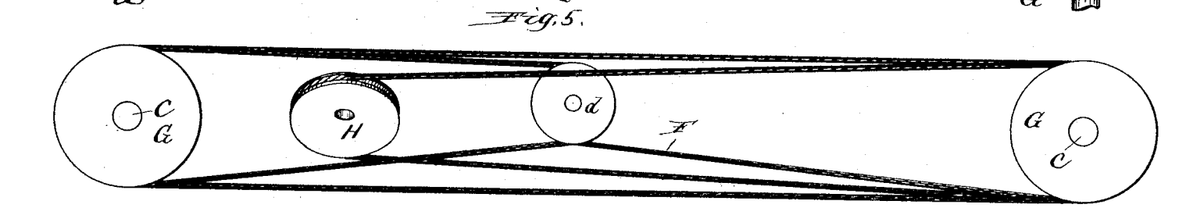
Fig. 5 is a side elevation of the rope connection shown in Fig. 4.
Figure 17:
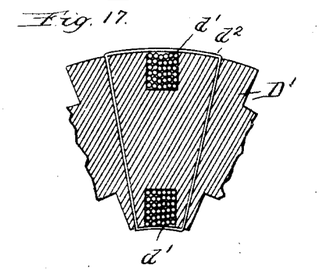
Fig. 17 is a detail sectional view of a portion of the armature, showing the means for retaining the coils in place.
Figure 19:
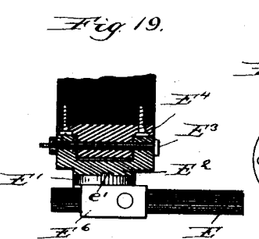
Figs. 19, 20, 21, and 22 are detail views of the brush-holder.
Figures 20, 21:
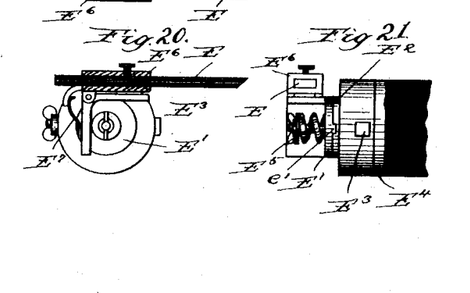
Figure 22:
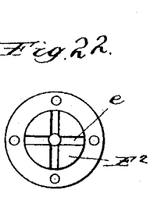
Figure 23:
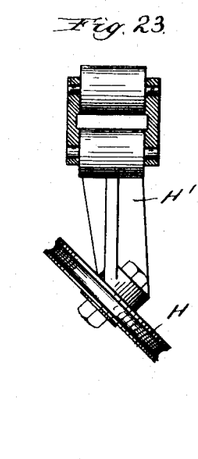
Figs. 23 and 24 are detail views showing the rope-tightening pulley and its carriage.
Figure 24:
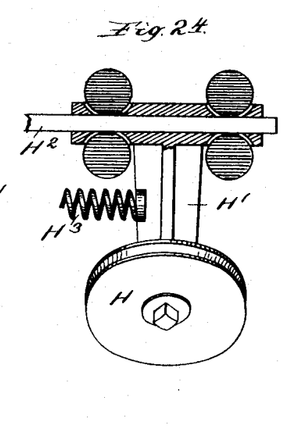

In Fig. 17 a section of the revolving armature is shown. Each coil $d'$ of the armature-ring D is held in place by a separate loop or band holder $d^2$. The coils $d'$ are sunk beneath the surface of the armature-ring, so that their insulation will not be injured by contact with the floor or ground in handling the armature. The sleeve $g$ and pinion $g'$, which are preferably made integral with each other, as indicated in Fig. 3, are split into two halves longitudinally, the parts being held together by the ring $c^2$, the collar $k^3$, and by the pulley-wheel G, so that this sleeve and gear, which is the part most subject to wear, can be removed from the car-axle without disturbing the car-wheel. To do this it is only necessary to slip the collar G' to one side on the axle and then in like manner slip the pulley G, collar $k^3$, and friction-wheel K.

I claim—

1. The combination, in an electric-motor car, of an electric motor having a revolving shaft, a grooved driving-pulley, to which motion is communicated from said shaft, the car-axle, a grooved pulley by which motion is communicated to said axle, a rope connection between said pulleys for communicating motion from the motor to the car, and a rope-tightener pulley, substantially as specified.

2. The combination, in an electric-motor car, of an electric motor having a revolving shaft furnished with a driving-pulley, the car-axle furnished with a pulley and a rope connection between the motor and axle, and a rope-tightener pulley around which one loop of the rope connection passes, substantially as specified.

3. In an electric-motor car, the combination of the truck-frame, the car-axles, pivoted or swinging hangers supporting the truck-frame from the car-axles, so that the car-axles may have a longitudinal movement, an electric motor supported on the truck-frame, and a rope connection between the motor-shaft and its pulley and the car-axle and the driving-pulley thereon, substantially as specified.

4. In an electric-motor car, the combination, with the frame, of a motor suspended therefrom on pivoted hangers, substantially as specified.

5. In an electric-motor car, the combination, with the frame, of a motor suspended therefrom on pivoted hangers, the connections between said hangers and motor-frame having rubber or elastic cushions, substantially as specified.

6. In an electric-motor car, the combination of an electric motor with the axle of the car furnished with a revolving sleeve and pulley, a rope connection between the motor-shaft and said pulley having two or more loops, a rope-tightener pulley around which one loop of said rope connection passes, an internal planet-gear motion-reducing mechanism for communicating the motion of said pulley and sleeve to the car-axle, and a friction-wheel and brake whereby more or less power may be communicated to the axle, as desired, substantially as specified.

7. The combination, in an electric-motor car, of an electric motor, a grooved driving-pulley connected thereto, the car-axle, a second grooved pulley, and a rope connection between said two grooved pulleys for communicating motion from one to the other, one of said pulleys being loose and furnished with a friction-gear connecting mechanism, substantially as specified.

8. The combination, in an electric-motor car, of an electric motor having a revolving shaft, a grooved driving-pulley to which motion is communicated from said shaft, the car-axle, a grooved pulley from which motion is communicated to said axle, and a rope connection between said pulleys for communicating motion from the motor to the car, said rope connection having two or more loops, and a rope-tightener pulley around which one loop of said rope connection passes, substantially as specified.

9. The combination, in an electric-motor car, of an electric motor having a revolving shaft, a grooved driving-pulley to which motion is communicated from said shaft, the car-axle, a grooved pulley from which motion is communicated to said axle, an endless rope passing over two or more grooves on one of said pulleys and over one or more grooves on the other of said pulleys, and a tightener-pulley set at an angle and taking the rope from one groove (say the first groove) of the pulley having the greatest number of grooves and returning the rope to the last groove of said pulley, substantially as shown.

10. The combination of the car-axle C, driving-pulley G, sleeve $g$, friction-wheel K, its brake K′, stud $k$, gear $k'$, and internal gear $c$, fast to the axle of the car, substantially as specified.

11. The combination of the car-axle C, pulley G, sleeve $g$, friction-wheel K, its brake K′, stud $k'$, gear $k$, internal gear $c$, secured to the axle of the car, an electric motor, and a rope connection between said motor and car-axle, substantially as specified.

12. The combination of a car with the motor suspended therefrom on pivoted hangers furnished with insulating and noise-deadening cushions, substantially as specified.

13. In an electric-motor car, the combination of a car and its axles with a motor having a revolving shaft furnished with a pulley and a rope connection from the motor to the car-axle, said motor being supported on pivoted hangers, whereby the weight of the motor tends to tighten the rope connection, substantially as specified.

14. The combination of a car and car-axles with a motor suspended on pivoted hangers and a rope or flexible connection for communicating the motion from the motor to the car-axles, whereby the weight of the motor is utilized to keep a tension on the flexible connection, substantially as specified.

15. The combination, with a car, of an electric motor having a frame furnished with a removable standard to support the armature, a grooved driving-pulley on the armature-shaft, the car-axle, a grooved pulley thereon, a rope connection for transmitting the power from the motor to the car-axles, and a rope tightener pulley, said rope being removable from its pulleys, whereby the armature and its shaft are adapted to be removed bodily with ease, substantially as specified.

16. In an electric-motor car, the combination, with a motor, of the car-axles, a grooved driving-pulley on the armature-shaft, grooved pulleys connected with the car-axles, a rope-tightener pulley, and a rope-connection leading from the motor to both axles, whereby the tension or strain of the rope connection on the motor-shaft is neutralized, substantially as specified.

17. In an electric-motor car, the combination, with a motor, of the car-axles, pulleys on the motor-shaft and on the axles, and a rope connection for transmitting power from the motor to the car-axles, one of said axles serving as a counter-shaft for a pulley to reduce the speed of revolution without the use of gears, substantially as specified.

18. In an electric-motor car, the combination, with an electric motor having a removable armature, of a pivoted brush-holder mounted upon the motor-frame so that the brush may be swung back to permit the removal of the armature without disturbing any of the electrical connections, a grooved driving-pulley connected with the armature-shaft and a second grooved pulley connected with the car-axle, and a rope connection between said pulleys, substantially as specified.

19. In an electric-motor car, the combination, with a motor having an armature-shaft furnished with a driving-pulley between the bearings of said shaft, of the car-axle having a pulley and a rope or flexible connection from the motor-shaft to the axle passing astride the field-magnets of the motor, substantially as specified.

20. The combination of the car-axle C with pulley G, sleeve $g$, keyed to said pulley, friction-wheel K, loose on said sleeve, brake K′, gear $k'$, journaled to a stud on said friction-wheel, gear $g'$, fast to said sleeve $g$, and internal gear $c$, secured to the axle, substantially as specified.

21. The combination of the car-axle C with pulley G, sleeve $g$, keyed to said pulley, friction-wheel K, loose on said sleeve, brake K′, gear $k'$, journaled to a stud on said friction-wheel, gear $g'$, fast to said sleeve $g$, and internal gear $c$, secured to the axle, said gear $g'$ and sleeve $g$ being split longitudinally to facilitate the removal, substantially as specified.

22. The combination of the car-axle C with pulley G, sleeve $g$, keyed to said pulley, friction-wheel K, loose on said sleeve, brake K′, gear $k'$, journaled to a stud on said friction-wheel, gear $g'$, fast to said sleeve $g$, internal gear $c$, said gear $g'$ and sleeve $g$ being split longitudinally to facilitate the removal, and a ring $c^2$, substantially as specified.

23. The combination of the car-axle C with pulley G, sleeve $g$, keyed to said pulley, friction-wheel K, loose on said sleeve, brake K′, gear $k'$, journaled to a stud on said friction-wheel, gear $g'$, fast to said sleeve $g$, internal gear $c$, oiler L, and oil-ducts $l$, substantially as specified.

24. The combination of the car-axle C with pulley G, sleeve $g$, keyed to said pulley, friction-wheel K, loose on said sleeve, brake K′, gear $k'$, journaled to a stud on said friction-wheel, gear $g'$, fast to said sleeve $g$, and internal gear $c$, said gear $c$ and wheel K having overlapping countersunk shoulders $c^3 k^2$, substantially as specified.

25. The combination of the car-axle C with pulley G, sleeve $g$, keyed to said pulley, friction-wheel K, loose on said sleeve, brake K', gear $k'$, journaled to a stud on said friction-wheel, gear $g'$, fast to said sleeve $g$, and internal gear $c$, said gear $c$ and wheel K having overlapping countersunk shoulders $c^3 k^2$ and said internal gear $c$ being provided with a packing-ring $c^4$ to form an oil-chamber, substantially as specified.

26. The combination of the car-axle C with pulley G, sleeve $g$, keyed to said pulley, friction-wheel K, loose on said sleeve, brake K', gear $k'$, journaled to a stud on said friction-wheel, gear $g'$, fast to said sleeve $g$, internal gear $c$, and covering-plate K$^7$, substantially as specified.

27. The combination of the car-axle C with pulley G, sleeve $g$, keyed to said pulley, friction-wheel K, loose on said sleeve, brake K', gear $k'$, journaled to a stud on said friction-wheel, gear $g'$, fast to said sleeve $g$, internal gear $c$, said gear $c$ and wheel K having overlapping countersunk shoulders $c^3 k^2$ and said internal gear $c$ being provided with a packing-ring $c^4$ to form an oil-chamber, and covering-plate K$^7$, substantially as specified.

HAROLD P. BROWN.

Witnesses:
A. M. BIRDSALL,
ALFRED G. COALE.